United States Patent [19]

Nicolaus

[11] Patent Number: 4,505,167

[45] Date of Patent: Mar. 19, 1985

[54] FLOATING PAWL STRUCTURE PROVIDING COMPOUND ANGULAR YIELDABILITY

[75] Inventor: Frank G. Nicolaus, Chicago, Ill.

[73] Assignee: Bally Manufacturing Corporation, Chicago, Ill.

[21] Appl. No.: 447,246

[22] Filed: Dec. 6, 1982

Related U.S. Application Data

[63] Continuation-in-part of Ser. No. 891,310, Mar. 29, 1978, Pat. No. 4,411,428.

[51] Int. Cl.$^3$ .......................... A63F 5/04; F16D 49/00

[52] U.S. Cl. ................................ 74/577 R; 188/82.7; 188/82.77; 273/143 R

[58] Field of Search .................... 273/143; 188/31, 60, 188/69, 82.1, 82.7, 82.77; 74/84 R, 577 R, 577 S, 578, 436

[56] References Cited

U.S. PATENT DOCUMENTS

| | | | |
|---|---|---|---|
| 1,263,496 | 4/1918 | Wenderhold | 74/436 |
| 2,270,283 | 1/1942 | Ewald | 188/82.77 X |
| 2,477,137 | 7/1949 | Mihalek | 188/69 |
| 2,509,639 | 5/1950 | Harker et al. | 74/436 |
| 2,751,815 | 6/1956 | Larson | 74/84 X |
| 4,239,225 | 12/1980 | Burnside | 273/143 R |
| 4,267,748 | 5/1981 | Grunewald et al. | 74/577 S X |

*Primary Examiner*—Paul E. Shapiro

*Attorney, Agent, or Firm*—Callard Livingston

[57] ABSTRACT

A shock and overload relieving pawl structure for driving and indexing operations in which the pawl element is part of a floating carrier structure having simple and complex multi-angular mobility in coaction with a bi-directional normalizing spring arrangement all operative such that the carrier and its pawl element are capable of multiplex yieldability linearly, angularly or in compound linear and angular displacement from a normal operating position responsive to engagement with or by the working load or mechanism in either driving or indexing action, as in ratcheting, advancing, or arresting gears and analogous toothed and notched members, with capability of relieving adjustment in the event the engaged or controlled member becomes immovable due to malfunction or intentional restraint. The pawl structure may take variant forms for adaptation to gears, levers, slides, etc. in rotary, oscillatory, or reciprocatory action.

11 Claims, 14 Drawing Figures

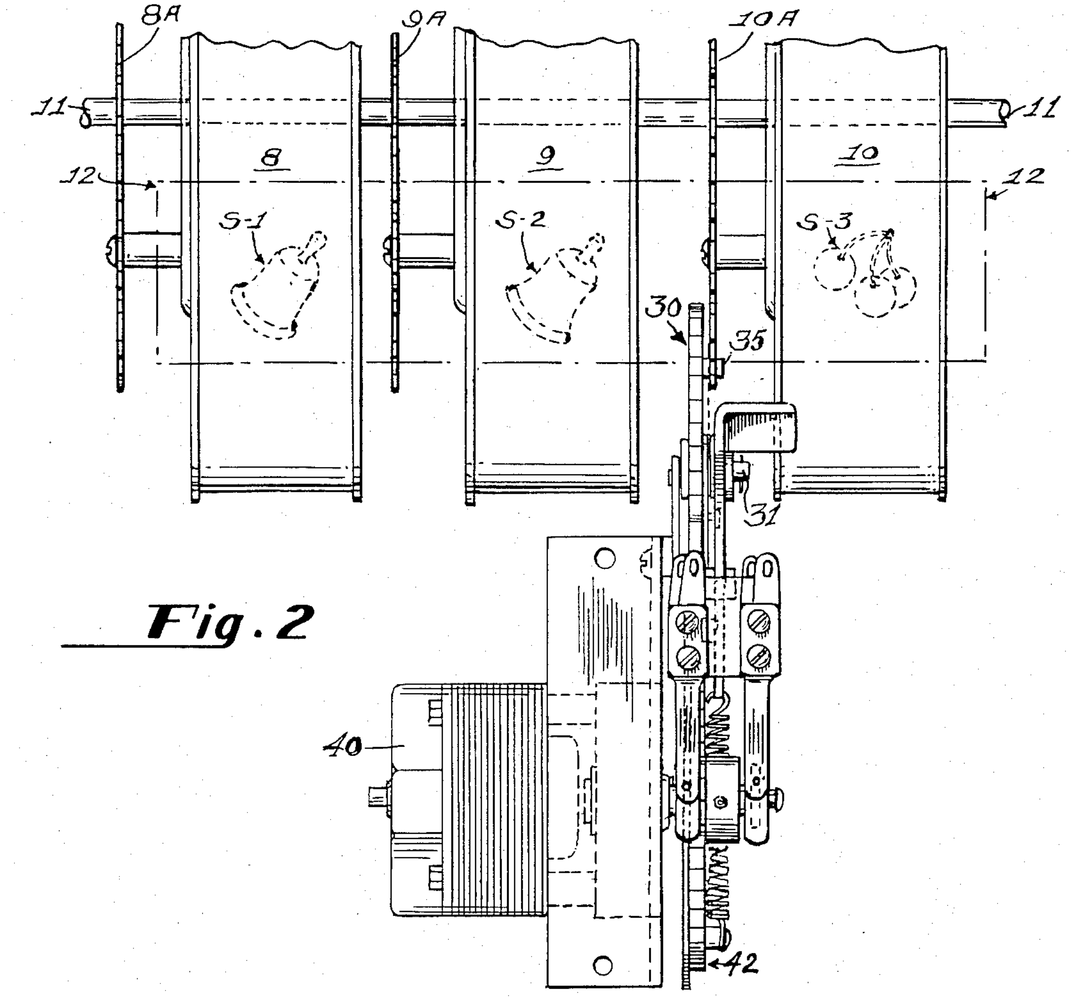
Fig. 2
Fig. 3
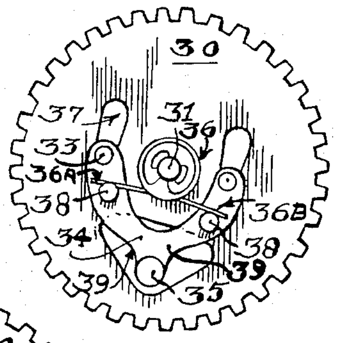
Fig. 3A
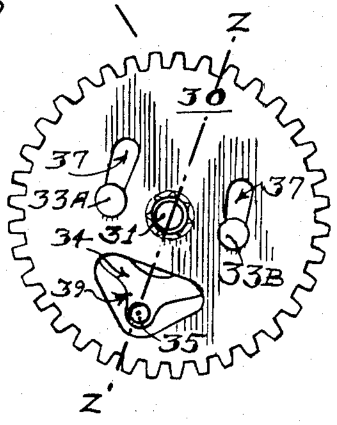
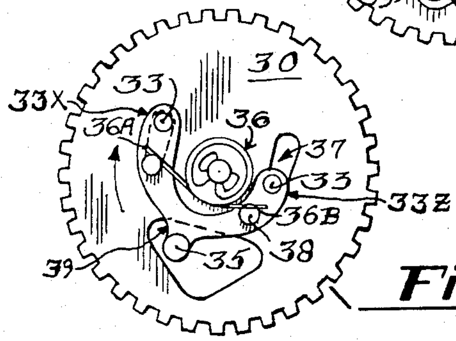
Fig. 3B

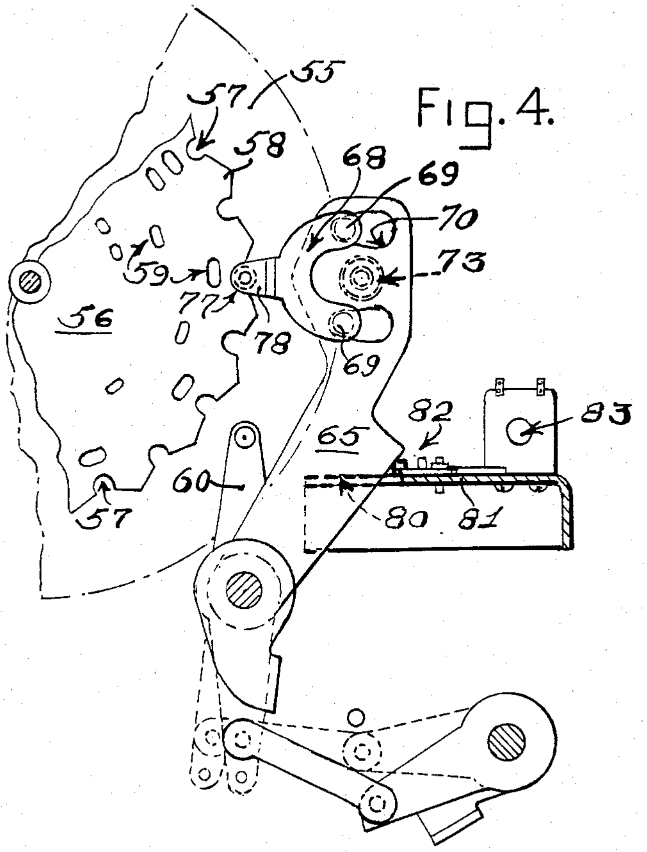
Fig. 4.
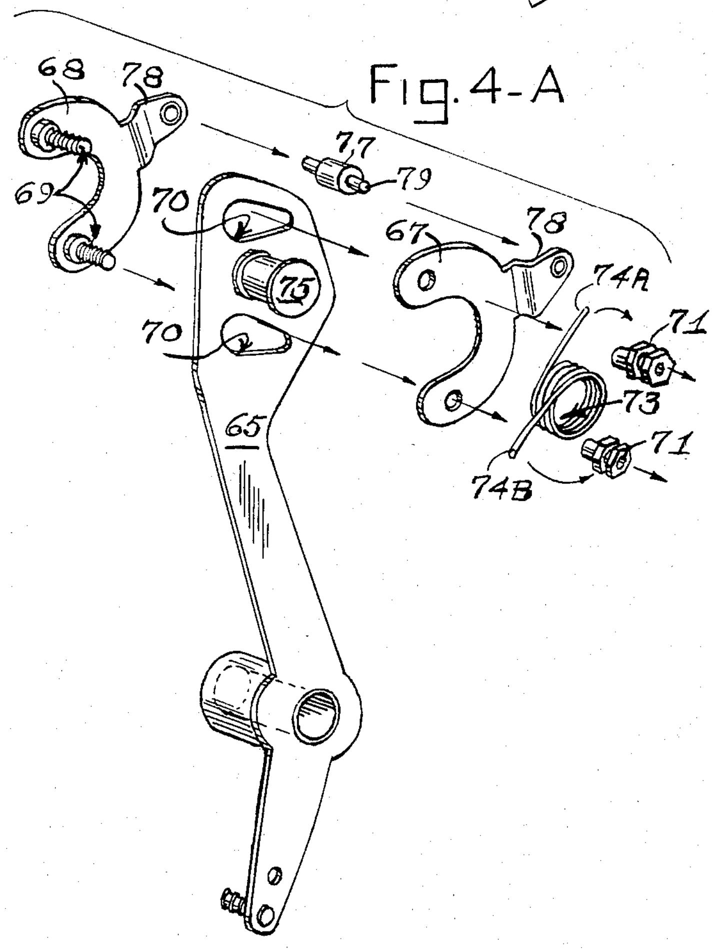
Fig. 4-A

FLOATING PAWL STRUCTURE PROVIDING COMPOUND ANGULAR YIELDABILITY

This application is a continuation-in-part of applicant's application Ser. No. 891,310, filed Mar. 29, 1978, now U.S. Pat. No. 4,411,428.

The invention provides a mechanical pawl structure adaptable to driving, indexing, and regulating the motion of denticulate mechanical elements such as gears, pinions, racks, and the like notched, slotted and toothed members which rotate, oscillate or reciprocate with advantages including the capability of multiplex yieldability in simple linear, angular, compound linear and angular displacement with self-adjusting reaction to engagement with or by some cooperative load or motion device such as a gear, rack, detent disc, or the like having teeth or notches engageable by the pawl element for the purpose of effecting or arresting its movement.

Conventional tooth-engaging pawls, ratchets, and detents are commonly known in forms both as rigid parts of a host lever or rotary member, and as pivoted elements supported on such levers and other actuating members, whether rotary, oscillatory, or reciprocable, and with and without biasing spring means and limiting stops, most such pawls, if yieldable at all, being limited to strickly linear or strictly pivotal displacement, two examples of such prior forms of pawl being seen respectively at 17 and 22, in FIG. 1 herein, to which further reference will be made hereafter, it being observed in general that for many applications prior pawl structures have not been available in simple form with capability of affording complete or adequate shock and jam-relieving multiplex mobility for yielding reaction to complex resultant forces involving simultaneous linear and angular components as, for example, in the case of certain kinds of indexing operations in which a rapidly rotating member with appreciable momentum must be indexed into an abrupt stop, or where a pawl-driven member becomes immovable due to malfunction or intentional restraint, with the result that in such case impact shock and wear on all parts from conventional pawl action can be severe, very noisy, and a source of inaccuracy and operational failure.

In accordance with the invention, the pawl element which is to engage with the driven, controlled, or indexed member is carried by or forms part of a floating carrier slidably disposed on a host actuating lever, gear, or other actuating instrumentality, and is biased by multiplex spring action in a manner to have yielding linear, angular or compound linear and angular shiftability within a predetermined range of guided displacement responsive to engagement and reaction with the cooperative driven, indexed or other coacting instrumentality, with advantageous reduction of impact shock, rebound, and wear; and with capability of full retreat or effective relief in case of overloading, jamming or other restraint.

Further aspects of novelty and utility inherent in the invention will appear from the following description of preferred variant forms of the novel pawl structure taken in view of the annexed drawings in which:

FIG. 2 is a fragmentary front elevational view of parts of the game apparatus shown in FIG. 1;

FIG. 3 is an elevational detail of one side of the driving gear embodiment of the pawl structure seen in FIG. 1 with the pawl in a normal position;

FIG. 3A is a view of the opposite side of the gear-type pawl structure of FIG. 3;

FIG. 3B illustrates a change-position condition of the pawl carrier of FIG. 3;

FIG. 4 is a fragmentary side view of a modified form of the pawl structure in a composite form adapted to use with an indexing lever in conjunction with illustrative game apparatus;

FIG. 4A is an exploded assembly detail of the pawl structure of FIG. 4;

Figure 1:
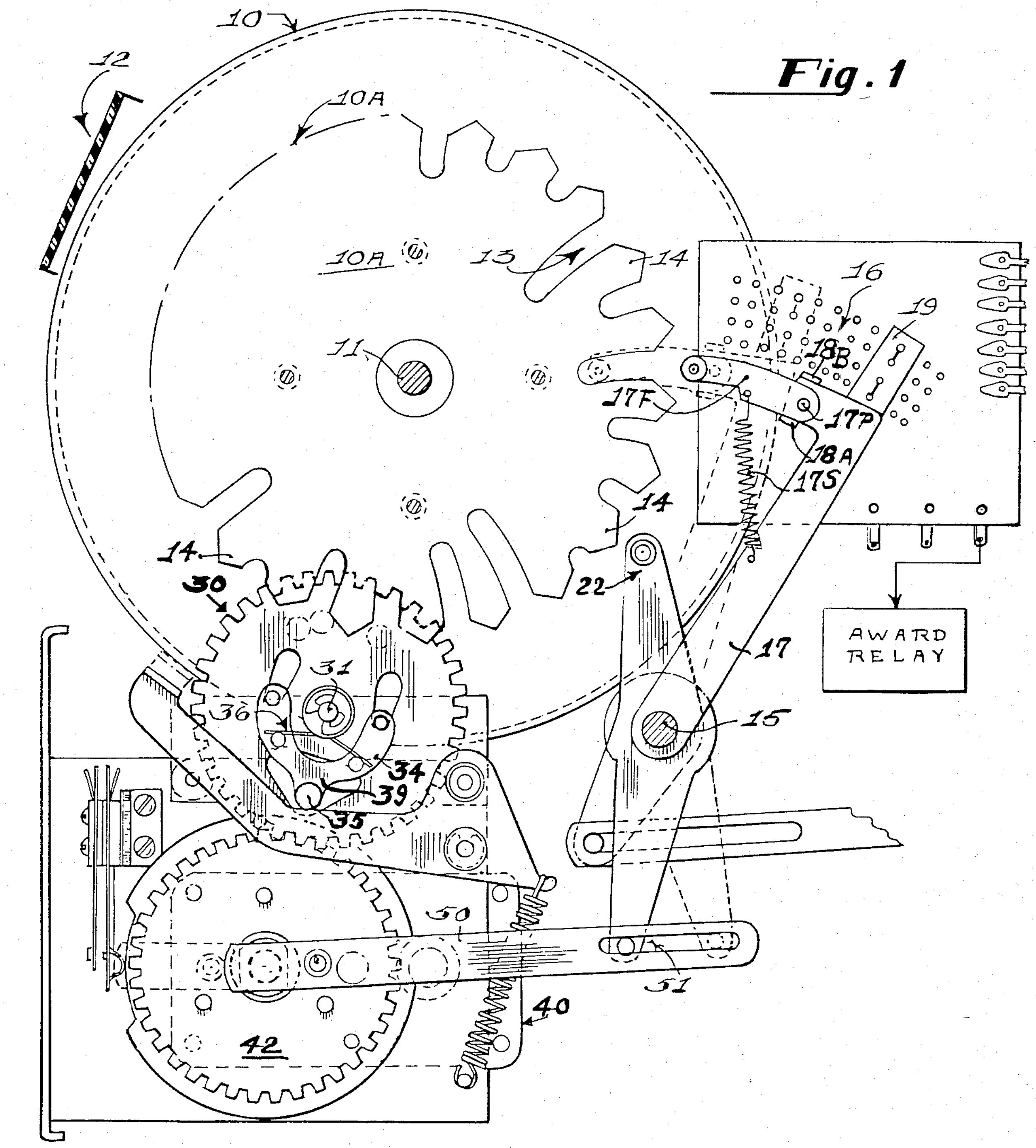
FIG. 1 is a side elevation of parts of a spinning reel game apparatus utilizing the pawl structure in a stepping gear system.

An embodiment of the improved floating pawl structure adapted for driving purposes is seen at 34 in FIG. 1 in illustrative association with a rotatable stepping gear 30 utilized in a spinning-reel game apparatus which is the subject matter of the mentioned copending Application, Serial No. 891,310, in accordance with which the gear 30 can be rotated in duty cycles by a power gear 42 driven by a motor 40 to cause the stepping gear 30 in each cycling thereof to step a reel code disc 10A and its associated reel 10 on shaft 11 by the angular amount of one code notch 13 and its corresponding symbol S-3 (FIG. 2) as the result of transient engagement of the pawl element or stud 35 with one of the toothed portions 14 of the disc flanking each code notch, the pawl element 35 being disposed on the stem portion 39 of a forked or yoke-shaped carrier member 34 having multiplex angular yieldability beneficially operative in particulars hereinafter appearing.

Referring to FIG. 3, the yoke-shaped pawl carrier 34 is captured for multi-directional sliding movement on one side of a host actuating member such as the driving or stepping gear 30 by means of studs 33 set into the ends of the yoke arms and extending through respective guide slots 37 of predetermined special configuration to the opposite side of the gear, as seen in FIG. 3A, where respectively enlarged head portions 33A, 33B thereof prevent separation of the carrier from the gear while permitting its free sliding motion in the direction and to the extent determined by the shape and disposition of said guide slots and the stud movements permitted thereby, it being observed in this particular embodiment, as evident in FIG. 3A, that the slots are disposed on opposite sides of a reference center of motion of the carrier which in this instance is the hub 31 of the gear 30, said slots being pitched and elongated in a chordal sense and wider at one end than at the opposite end in a somewhat pear-shaped configuration and in diverging pitch at their smaller ends, by reason of which the carrier is guided to move under spring action into a normal operating position such as seen in FIGS. 3A and 3B, in which the load-engaging pawl element or stud 35, with reference to FIG. 3A and reference axis Z—Z particularly, is disposed in substantially radial alignment with the reference center or gear hub 31, the carrier being urged into such normal position by compound action of multi-bias spring means such as a coiled torsion spring 36 disposed at the gear hub and having opposite free ends 36A, 36B each diverging to apply oppositely and angularly-action thrusts against corresponding stud elements 38 on each yoke arm operative constantly throughout the permitted range of displacement of the carrier.

The multi-angular mobility of the floating pawl structure is illustrated in part in FIG. 3B wherein the carrier is seen to be angularly displaced or rocked relative to the hub 31 with the pawl element 35 moved to an extreme position toward the left as limited by disposition of the guide stud 33 at the wider end 33X of the appertaining guide slot 37, while the guide stud 33 in the companion yoke arm is disposed at the opposite and narrower end 33Z of its guide slot, it being evident that the carrier could as well have been displaced angularly by the same amount in the opposite direction; it being further evident that the carrier could also assume any resultant displacement attitude in between the aforesaid extreme or limiting positions. From FIG. 3 it will be further understood that because of the pitch, widening configuration, and location of the respective guide slots 37, the carrier and its pawl stud 35 can also retreat in a partially or entirely linear path, for example radially of the hub 31, with possible further complex mobility responsive in general to both linearly and angularly-acting forces in a resultant working reaction depending upon the nature of the load forces acting from moment-to-moment between the pawl component 35 and whatever controlled or cooperative loading instrumentality is intended to coact with such pawl element, for instance a rotatable member such as the code disc 10A on shaft 11 of FIG. 1, or such a member spinning on said shaft.

If it is assumed, with reference to FIG. 1, that the code disc 10A for any reason is immovable when the stepping gear 30 is cycled, the pawl structure could yield completely in the manner depicted in FIG. 3B without jamming or damage to the driving mechanism or pawl means, such conditions being commonly encountered in many other operating environments.

It should be observed, in respect to the operation of the reel game apparatus of FIG. 1, that the spinning of the game reel 10 and its associated code disc 10A (and the companion reels 8 and 9 of the set of reels usual in such games) will be effected by the rapid oscillation of a conventional lever-type driving pawl 22 on shaft 15 responsive to actuation of known reel-spinning mechanism (not shown) such that the pawl element 22 is momentarily thrust in a quickly retractive kicking impact against one of the peripheral disc teeth 14 situated in between code notches 13 which are of varying depth radially in correspondence with the various score or award values arbitrarily assigned to the appertaining reel symbols seen in FIG. 2 at S-1, S-2, S-3 on reels 8, 9 and 10, and which are to be sensed in an indexing operation after being allowed to spin freely during a short random interval.

Promptly following the setting of the reels into spinning motion as aforesaid, each reel in the set (which may include as many as five or six reels) will be abruptly stopped or "indexed" into a display position sequentially one after another before a viewing window 12 (FIGS. 1, 2) as the result in each instance of the random-occurring advance of a corresponding index lever 17 to thrust the appertaining conventional pawl finger 17F pivoted at 17P, forward toward the left in FIG. 1 into the full depth of some one of the code notches, as indicated in dotted lines, the conventional pawl finger 17F in this instance being held against a stop lug 18A by a traction spring 17S acting in one direction with only a short range of yieldability permitting movement of the pawl in the opposite off-normal direction before it encounters another stop lug 18B, it being evident that this conventional pawl means is yieldable only along a very short, fixed arc—and then only in one direction from its normal operating position back against the normal lug 18A.

In the foregoing indexing operation the conventional pawl finger 17F is required to remain in the code notch in which it lodges in order to maintain the reel in the required display position and also to assure that the appertaining score or award switch wiper 19 will remain in its corresponding readout position in the back of contacts 16 until otherwise legitimately moved thereafter, from which it will be appreciated that this prior-known type of lever pawl imposes the objectionable limitation that the reel and disc assemblies cannot be moved either for spinning purposes or in any game replay, repositioning, or like option feature play unless the appertaining index lever and its pivoted pawl finger 17F are first fully withdrawn from the indexing position shown in dotted lines because of the mentioned necessity for activating all spinning pawls 22 in unison, and the further fact that there is not the requisite yieldability in the conventional pawl structure to permit group spinning in the case the game player wishes to exercise the well-known "Hold and Draw" game option of holding one or several of the reels while recycling others in a renewed spinning cycle; it being for related reasons that it is necessary also to provide in a reel "repositioning" apparatus, such as shown in FIG. 1, a lost-motion crank linkage 50, 51, in the driving connection between the motor gear 42 and the index lever 17, in order that the index lever can be activated in all normal spinning cycles independently of the auxiliary repositioning unit; and conversely, in order that the repositioning operation of such auxiliary unit can go forward by reason of its automatic withdrawal of the index lever as the result of the provision of the said lost-motion crank action when the appertaining reel is to be stepped forward or backward in exercise of the "Repositioning" option to change the symbol display.

A further characteristic of conventional forms of indexing pawl which is objectionable in operations to stop a spinning or rotating member, such as described above, is that they operate on brute-force principles with considerable mutual collision impact between the pawl component or element which actually engages the load or indexed rotating disc member or other moving instrumentality, yet such pawls have either no yieldability at all or a very limited short-range yieldability, restricted to a short linear or a short arcuate path in one direction (as exemplified by the pawl means 17, 17F, FIG. 1) such that the indexing action as a whole for conventional pawls inherently gives rise to noisy, harsh, and wear-inducing action made tolerable for applications such as that of FIGS. 1 and 2 only by utilization of light-weight momentum-reducing reel and disc structures in which the code disc must nevertheless be made of steel for wear resistance to repetitious indexing impacts.

In further accord with the invention, a variant form of the floating pawl structure which is very effective for indexing operations, although in no way limited thereto, is depicted in FIG. 4 in illustrative association with a somewhat different type of game-reel and code-disc assembly in which a reel 55, jointly rotatable with its code disc 56, is adapted for photoelectric rather than mechanical value-sensing, and has peripheral indexing notches 57 of uniform depth intervening between successive spinning teeth 58, the award value-determining function in this arrangement being provided by light-transmitting apertures 59 disposed on the side of the disc in various patterns of radial alignment with corresponding indexing notches 57 to provide score or award readout in cooperation with known photoelectric scanning means (not shown) after the reels have been set spinning by the conventional type of rigid spinning pawl 60 and then indexed into display positions, the spinning operation in this arrangement being effected in the usual way for all reels in unison by joint kicking action of an entire set of conventional spinning pawls such as the rigid pawl 60, in the known manner previously described, such spinning being randomly stopped shortly thereafter by advance of the modified indexing lever 65 under control of random indexing means (not shown) as in the operation described for the game apparatus of FIG. 1, but distinguished therefrom by use of a modified form of the pawl structure described next in view of FIGS. 4 and 4A, in that the pawl carrier means is of composite character comprising two of the yoke-shaped members joined in fixed, side-by-side alignment and spaced apart in a way to flank and glide upon opposite sides of the head of the indexing lever 65.

The aforesaid composite pawl carrier structure, as applied to the indexing lever 65 shown in association with the illustrative game arrangement of FIG. 4, consists of two yoke-shaped (FIG. 4A) carrier configurations 67, 68 aligned in parallel spaced juxtaposition to fit slideably onto the flat head of the lever 65, one on each side thereof, and fixed in assembly by means of threaded shoulder studs 69 staked into the yoke arms of a first one of the yoke members 68 and respectively projecting through correspondingly aligned guide slots 70 in the lever head, which is enlarged to afford a suitably extensive gliding land supportive of the maximum range of operational displacement intended for the carrier assembly thereon, the threaded end portions of the studs 69 respectively extending through corresponding holes in the confronting portions of the respective arms of the companion yoke 68 for engagement with respective retaining means such as the nuts 71, the studs being shouldered behind the threading so that the nuts can be set up tightly while leaving the flanking yoke assembly freely slideable on the lever head.

The foregoing form of the pawl structure further includes a multiplex spring means 73 carried on a grooved post 75 which is staked into the lever head to stand in the zone between the arms of one of the yokes, the spring means having oppositely and angularly acting free end portions 74A, 74B each bearing against one of the stud nuts to exert composite angularly acting forces on the yoke assembly as a whole, cooperatively with the guiding pattern determined by the stud and slot means 69, 70, and thereby urging the carrier into the normal operating position seen in FIG. 4. As in the case of the embodiment of FIGS. 3 to 3B, the shape, disposition and angular orientation of the guide slots 70 determine the character and range of linear, angular and compound pawl movement, as well as the normal home position of the carrier structure on the host actuating member, whether a gear, as in FIG. 3, or a lever, as in FIG. 4.

The pawl structure of FIG. 4A is completed by the provision of a projecting pawl or load-engaging element in the form of a small roller 77 carried on a short spindle pin 79 having its ends seated in oppositely offset tab or wing projections 78 on respective yoke members, the opposite ends of said spindle pin preferably being headed or otherwise secured to further interconnect the offset yoke projections and afford additional rigidity to the carrier assembly as a whole.

The complex multi-angular mobility of the composite pawl carrier 67, 68 floating on the head of the index lever 65, as aforesaid, makes it possible to utilize the previously-mentioned optional "Hold and Draw" play feature in a simplified and more economical variant form of the game reel and code disc arrangement, such as that also illustrated in FIG. 4, wherein the index lever 65 works freely in a guide slot 80 formed in a shelf plate 81 at the rear of the lever (which shelf is actually common to the entire set of index levers in a multi-reel game providing this feature) and a "Hold" blocking lever 82 pivoted on such shelf plate will be moved into blocking position across said slot behind the index lever, as shown in FIG. 4, responsive to energization of a corresponding "Hold" solenoid 83, with resultant blocking of withdrawal of the index lever and its appertaining pawl means 67, 68, 77 from indexing engagement with the code disc, it being recalled that the reel-spinning operation in such multi-reel games requires that all spinning pawls 60 (as with pawl 22 in FIG. 1) are actuated in unison, in consequence of which some relief must be provided for the impact of any particular pawl 60 in striking the code disc teeth while the index lever remains in the "Hold" condition for one or more reels.

Such relief is afforded by the yieldability of the novel floating pawl structure, which permits the code disc to yield in a momentary rocking action from the rapid blow of the spinning pawl 60, and still remain thereafter in its indexed position, so that not only will the "held" reel retain its original position, but the corresponding photoelectric readout effected in the original reel cycle will remain unchanged for the held reel during the re-spin effected by the optional "Hold and Draw" recycling. In some game arrangements all but one reel in a set (comprising as many as five or six reels) may be "held", in which case the loading on the spinning mechanism would be objectionable and a source of trouble in the absence of the floating compound yieldability of the disclosed pawl improvements.

Figure 5:
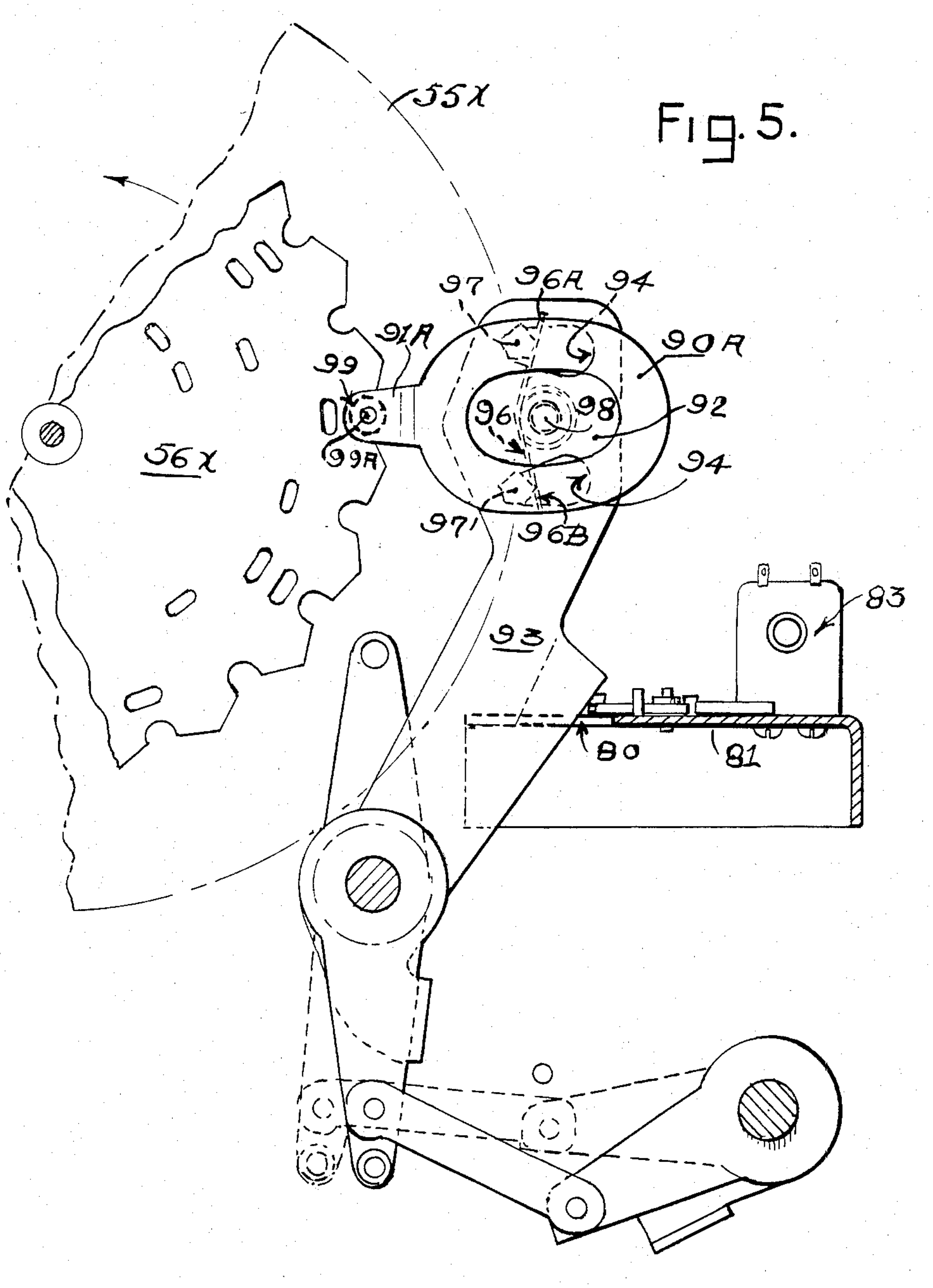
FIG. 5 is a side elevation of a modified embodiment of the composite type of pawl structure utilized in combination with a lever-type indexing mechanism.

A further modification of the composite type of floating pawl structure particularly suited to heavy duty indexing and general service, is depicted in FIG. 5 to serve as an indexing pawl in association with a game reel 55X and its code disc 56X. As detailed in FIG. 11, this form of composite pawl comprises an assembly of two somewhat oblate ring-shaped plates 90A, 90B, each of which includes an offset pawl projection 91A, 91B, the rings being fixed in spaced parallelism with each other to flank enlarged gliding areas or lands 92 on opposite sides of the enlarged head of the host support or actuating member, which is in this case the indexing lever 93, in consequence of which the gliding areas for each ring are relatively much greater than in the case of the embodiment of FIG. 3, for example, and the land areas afford rugged stability as well as potential for expanded range of multi-angular mobility permitting variations in the size, configuration, and disposition of the guide slots 94 to meet changes in operating requirements, the pattern in this embodiment being similar to that of the previously-described structures for service with the illustrative reel-game apparatus previously described.

Figure 6:
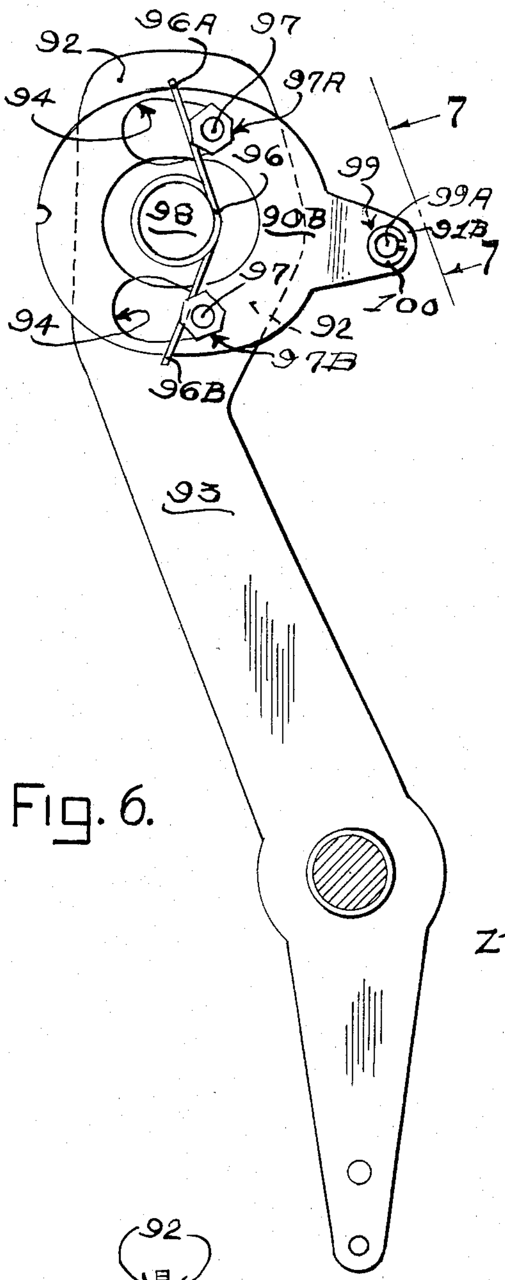
FIG. 6 is an elevational view of the opposite side of an indexing pawl structure like that of FIG. 5.
Figure 7:
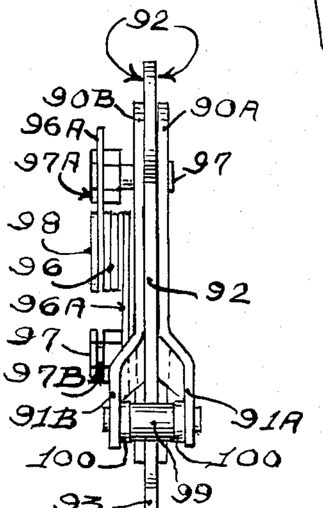
FIG. 7 is a fragmentary front elevational view of the indexing pawl of FIG. 6 as seen in the direction of lines 7—7 of FIG. 6.
Figure 11:
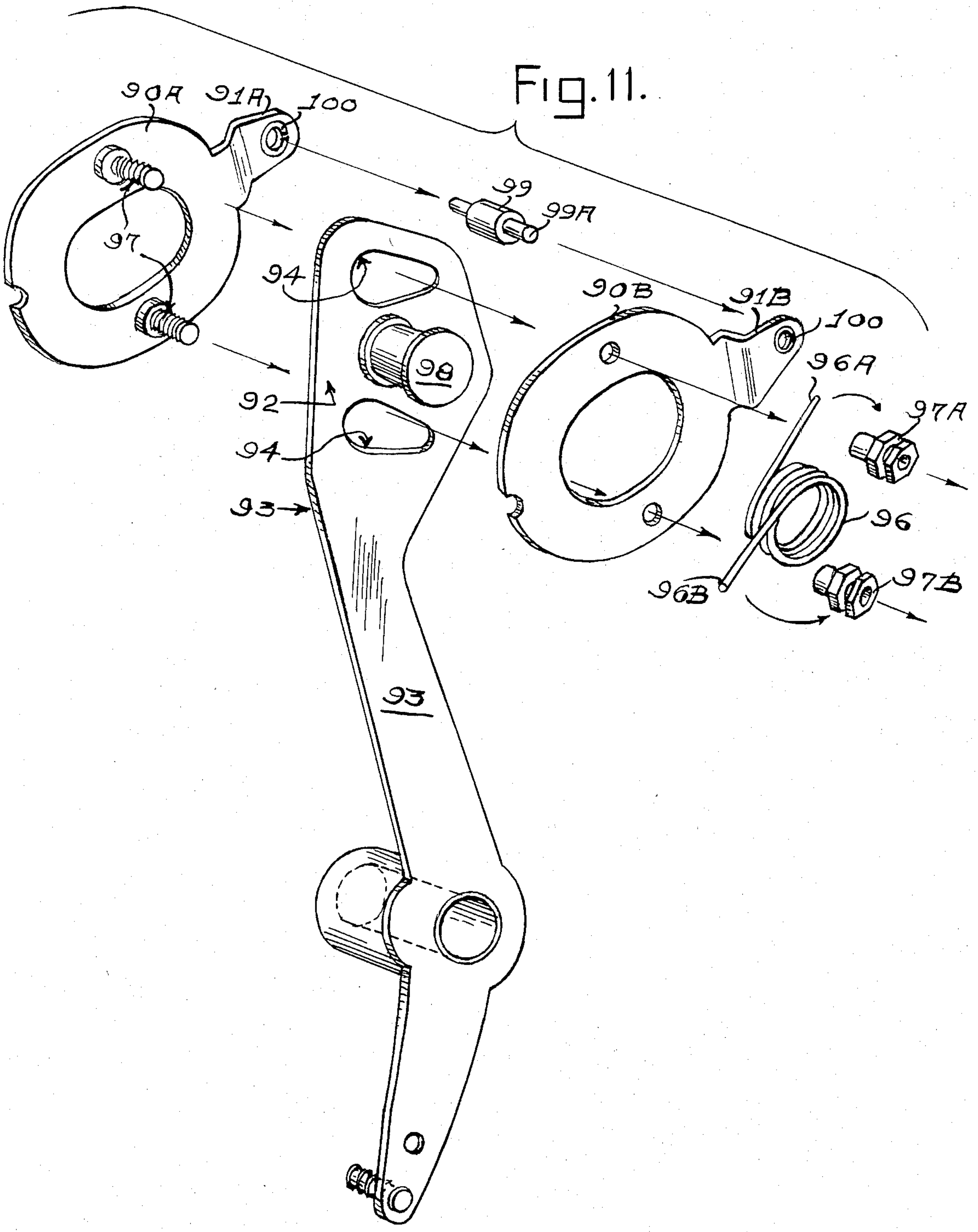
FIG. 11 is an exploded assembly view of components of the form of pawl shown in FIGS. 6 to 10.

In the detailed construction shown in FIG. 11, the carrier assembly is glidingly captured on the lever head by means of threaded posts 97 staked into one of the rings 90A in the land area to continue on through corresponding holes in the companion ring 90B for engagement respectively with corresponding retaining means such as the grooved nuts 97A, 97B. (See also FIGS. 6 and 7.)

A spring-carrying post 98 is staked into the land area of the head between the guide configurations to retain the spring loading means for the carrier assembly, which in this arrangement also takes the form of a torsion spring 96 having opposite divergently-acting end portions 96A, 96B, to urge the carrier into its intended normal position as determined by the configuration of the carrier guiding means 94, 97.

Figure 8:
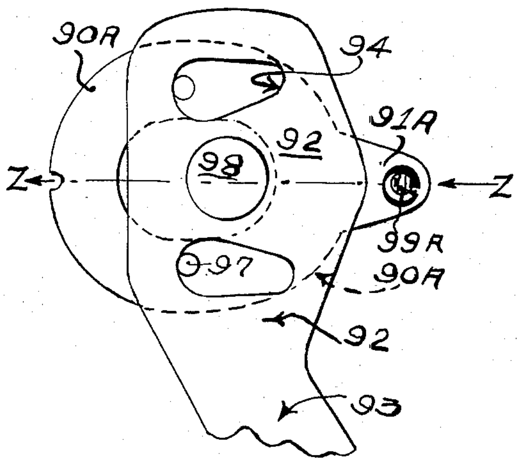
FIG. 8 is a fragmentary detail of the indexing pawl structure of FIG. 6 disposed in a linear retreating position, parts being removed.
Figure 9:
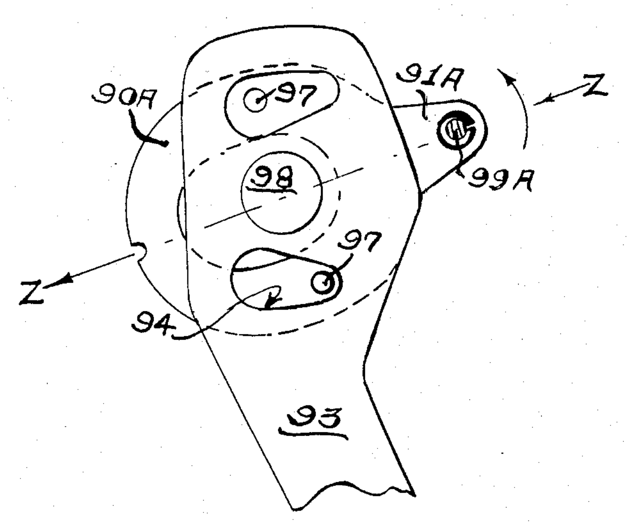
FIG. 9 is a view similar to that of FIG. 8 but with the pawl displaced in reactive yielding disposition upwardly and backwardly.
Figure 10:
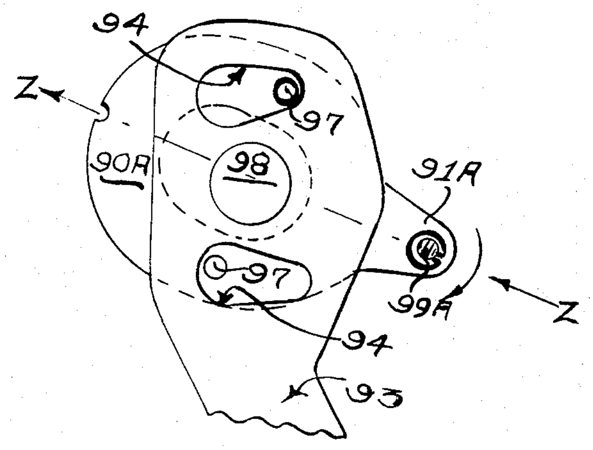
FIG. 10 is a change-position view similar to that of FIG. 9 but with the pawl element displaced downwardly and backwardly.

The load-engaging pawl element takes the form of a small roller 99 with a spindle 99A rotatable in Nylon insert bearings 100 set in the respective offset carrier-ring extension 91A, 91B, such that in the normal position of the carrier assembly, this pawl element will lie along the reference axis Z—Z through the spring carrying post 98 and the roller spindle 99A in the normal position thereof, as in FIGS. 8, 9, and 10. This reference axis thus extends generally through the normal position of the pawl element and a point on the land in fixed relation to the guide and spring means.

The foregoing composite carrier construction affords the same kind of multi-angular and linear yieldability and mobility as the previously-described embodiments, and has been found to show barely perceptible wear after prolonged continuously repetitious indexing operation equating to hundreds of thousands of operating cycles. The structure is also quiet in operation, and motion-picture studies of the reactive characteristics thereof in game apparatus of the type described disclose a slight oscillatory or rocking movement of the carrier responsive to the impact of a driving pawl (such as the conventional pawl 22 in FIG. 1) in striking the code disc teeth whenever such disc is held against movement, as in the elective "Hold and Draw" game feature wherein one or more reels are prevented from moving by action of the holding solenoid means 82, 83, FIG. 4.

This oscillatory motion is a composite of the linear retreat of the carrier illustrated by the directional arrows in FIG. 8, and the opposite pivotal or angular rocking movement, similarly indicated in FIGS. 9 and 10, about either pin 97 as a fulcrum.

Such motion-study results indicate that the energy of impact of the conventional type of driving pawl 22 is significantly absorbed by the novel floating pawl structure instead of being transmitted back through the entire driving and reel mechanism, as would be the case for the old conventional type of index lever 17, and accounts also for the nearly wear-and-noise-free operation of the floating pawl structure in indexing action.

A further important technical and utilitarian advance characterizing the disclosed pawl mechanism resides in its accuracy in indexing applications and capability of eliminating what is referred to in the reel-game art as "hang up" which is the failure to index a code disc and reel exactly with respect to a single indexing or code notch due to lodgement of the conventional type of pawl on the peak of one of the spinning teeth 58 instead of in any adjacent notch 57. Hang-up occurs almost consistently on the last reel of a set of several evidently for the reason that since the reels are indexed or stopped sequentially, there is no further jamming impact of the conventional indexing operation to shake a hung-up pawl free, whereas such jarring and freeing of a hung pawl usually occurs in preceding reels before the last reel comes to rest, and there is no further impact disturbance to free a hung pawl.

In test studies, hang-up or non-indexing has been found to occur on the last reel of a set with a frequency of 1 in every 59 indexing operations with conventional pawls, whereas the floating pawl structure of FIG. 5 produced only 4 non-indexes of the hang-up type in 3 million operating cycles. Such performance is believed due to the omni-directional yieldability of the floating pawl structure in its reference plane of motion which is substantially parallel to a planar gliding surface of the host support or actuating member, such as the surface of the gear embodiment of FIGS. 3 to 3B, and the expansive land areas afforded by the enlarged heads (as at 92 in FIG. 8 for example) on the lever type carrier supports 65 and 93. Such utilities and performance will be recognized as having unlimited potential for application to indexing and driving operations in addition to those described in respect to reel-game usage.

I claim:

1. A pawl structure comprising an actuating support and a pawl carrier slidable thereon and having as a component thereof a load-engaging pawl member, and cooperative pin and slot guide means disposed on said carrier and support in sets spaced apart relative to each other and said pawl component, said guide means being operative to determine a multiplex angular and linear range of movement of the carrier relative to the supporting member between a normal position and a plurality of yield positions away therefrom including linearly, angularly, and compound linearly and angularly displaced motions; together with spring means yieldingly acting between said guide means sets and said support to urge said carrier cooperatively with said guide means into said normal position and affording multiplex yieldability for the aforesaid range and character of movement of the carrier responsive to the load forces acting on said pawl member in engagement thereof with a controlled, actuated or working load encountered thereby.

2. The pawl structure according to claim 1 wherein said carrier is of a forked or yoke-shaped configuration including opposite arms connected by a bight portion from which extends in the opposite direction a stem, said pawl member being disposed on said stem, said guide means comprises a stud member on each yoke arm engaging in a corresponding slot configuration on the actuating support, and wherein said spring means comprises a torsion spring carried on said support between said yoke arms and having opposite end portions each pressing against one of said stud members producing resultant forces urging the carrier into said normal position and permitting simple and compound yieldability of the carrier in directions away from said normal position in the range aforesaid.

3. A pawl structure according to claim 2 wherein said support is a rotatable gear and said guide means constrains the carrier to movement into said normal position along an axis generally radial of the axis of rotation of said gear.

4. The pawl structure of claim 2 further characterized in that said guiding configurations comprise elongated slots disposed respectively on opposite sides of a reference axis extending through said normal position equidistantly between opposite sides of said carrier in said normal position, said slots being pitched lengthwise in a divergent sense in a direction distally away from said normal position; said guide studs on the carrier engaging respectively in one of said slots to determine the range and directions of displacement of the carrier responsive to action of said spring means and working or load forces acting on said pawl component element.

5. The pawl structure of claim 4 wherein said supporting member is a gear rotatable about a central hub portion, and said normal carrier position disposes said stem portion of the carrier in said normal position in substantial alignment with a radius through said hub portion.

6. The pawl structure of claim 5 further characterized in that said pawl component is a stud-like element projecting from said stem portion.

7. The pawl structure of claim 4 further characterized in that said spring means comprises a torsion spring secured on said supporting member approximately centrally between said yoke arms and having endwise extensions acting in directions generally angularly toward each other and each respectively applying biasing thrust against a corresponding one of said yoke arms whereby to produce a resultant biasing force operative in conjunction with the guiding function of said guiding configurations and guide parts to urge the carrier into the normal position as aforesaid.

8. A multi-directionally yieldable pawl mechanism for driving and indexing engagement with or by cooperative toothed and notched loading members, said mechanism comprising a moveable host member; a pawl and means shiftably mounting the same on a land area on said host member for yielding retreating movement away from and return to a normal operating position; multi-directionally-acting spring means applying forces acting on said pawl relative to a reference axis through said normal position to urge it in a direction generally toward and into said normal position from any of a plurality of displaced mode positions within a predetermined range away from said normal position; said range being of a character permitting linear, angular and compound linear and angular modes of displacements of the pawl in retreating from said normal position and being determined by coacting guide means on the pawl and host member of a character affording increasing linear, angular and compound freedom of retreating displacement of the pawl in the general direction away from said normal position in variant reaction to driving and indexing loading on the pawl; said guide means being further operative in the direction of movement of the pawl back toward said normal position responsive to urgence of said spring means to increasingly confine and resultantly direct the movement of the displaced pawl back into said predetermined normal position in the absence of any extraneous loading or like opposition to the action of the spring means sufficient to prevent such return movement; the cooperative action of said spring means and said guide means being such that said pawl is also capable of substantial rocking motion crosswise of said axis in said normal position.

9. A pawl mechanism according to claim 8 further characterized in that said guide means comprises cooperative guiding pin and slot guide means respectively disposed on said host member and pawl, the slot means being situated on opposite sides of said axis and having a configuration such that the slot means increases in width away from said normal position to expand said range of movement, said spring means acting upon the pawl from opposite sides of said axis in a generally convergent sense angularly crosswise of said axis so as to resultantly urge the pawl generally toward and into said normal position under guidance of said pin means and slot configuration from any displaced position of the pawl within the range aforesaid and with capability to rock as aforesaid relative to said axis.

10. The pawl mechanism of claim 9 further characterized in that the host member provides two parallel land areas back to back on opposite sides of the host member, and the pawl is a composite structure comprising joined carrier members each disposed to move over one of said land areas, said guiding slot means comprising configured guiding slots disposed on opposite sides of the aforesaid axis through the normal position and a median point contained in a plane common to said land areas, and said spring means being in the form of a torsion disposed on said axis and centrally between said slots and having opposite end portions acting angularly toward each other against said pin means in a sense generally crosswise of said axis and resultantly urging the pawl structure in a direction generally toward and into said normal position from any permitted position of displacement therefrom for lodgement in the normal position as aforesaid in the absence of restraining forces opposing the action of said spring means.

11. A pawl mechanism comprising a pawl member, a carrier for said pawl member; supporting means for the carrier; carrier guiding means defining with respect to said supporting means a predetermined range of linear, angular and compound linear and angular motion of the carrier away from a predetermined normal position for the carrier and its pawl member relative to the supporting means and a reference axis extending from said normal position through a predetermined reference center on said supporting means; spring means applying substantially equal but oppositely-acting restorative forces at points on said carrier on opposite sides of said reference axis and in a region between said normal position and said reference center, said spring means being operative cooperably with the guiding action of said guide means to urge the carrier yieldingly toward said normal position and to return the carrier into said normal position in the absence of superior opposing extraneous force acting on the pawl, while yieldingly permitting the range of linear, angular, and compound linear and angular motion displacements aforesaid responsive to loading forces acting on the pawl member in pawl action.

* * * * *

UNITED STATES PATENT AND TRADEMARK OFFICE

CERTIFICATE OF CORRECTION

PATENT NO. : 4,505,167

DATED : March 19, 1985

INVENTOR(S) : Frank G. Nicolaus

It is certified that error appears in the above-identified patent and that said Letters Patent are hereby corrected as shown below:

In Claim 10, Column 10, line 33, after "torsion" insert --spring--.

Signed and Sealed this

*Thirteenth* Day of *August 1985*

[SEAL]

*Attest:*

DONALD J. QUIGG

*Attesting Officer* *Acting Commissioner of Patents and Trademarks*